United States Patent
Saleh

(10) Patent No.: US 12,488,771 B2
(45) Date of Patent: Dec. 2, 2025

(54) MULTI-PURPOSE PERCUSSION ACCESSORY STAND

(71) Applicant: Peter James Saleh, West Orange, NJ (US)

(72) Inventor: Peter James Saleh, West Orange, NJ (US)

( * ) Notice: Subject to any disclaimer, the term of this patent is extended or adjusted under 35 U.S.C. 154(b) by 0 days.

(21) Appl. No.: 18/368,002

(22) Filed: Sep. 13, 2023

(65) Prior Publication Data

US 2024/0185819 A1 Jun. 6, 2024

Related U.S. Application Data

(63) Continuation of application No. 16/819,028, filed on Mar. 13, 2020, now abandoned.

(60) Provisional application No. 62/818,081, filed on Mar. 13, 2019.

(51) Int. Cl.
*G10G 5/00* (2006.01)
*F16M 11/04* (2006.01)

(52) U.S. Cl.
CPC ............. *G10G 5/00* (2013.01); *F16M 11/041* (2013.01)

(58) Field of Classification Search
CPC .......... G10G 5/00; G10D 13/00; G10D 13/10; B25H 1/10; A47B 19/002; A47B 77/022; F16M 11/242; F16M 11/245; F16M 11/32; F16M 11/34; F16M 11/041; F16M 11/28
USPC ........... 108/27–30; 211/70.6; 248/188, 176.3
See application file for complete search history.

(56) References Cited

U.S. PATENT DOCUMENTS

| 2,158,807 | A | * | 5/1939 | Way | G10D 13/00 84/422.1 |
| 2,822,014 | A | * | 2/1958 | Cummaro | F16B 37/122 411/109 |
| 3,123,935 | A | * | 3/1964 | Williams | A47B 13/16 248/346.01 |
| D279,736 | S | * | 7/1985 | Zastera | D6/684 |
| 4,743,040 | A | * | 5/1988 | Breveglieri | B62B 3/10 280/47.35 |

(Continued)

OTHER PUBLICATIONS

Organized Empire; Bunk Bed SHelf for Top Bunk with Glow in the Dark Wayfinding Strip; Jan. 14, 2018; https://www.amazon.co.uk/Wayfinding-Install-Attachment-Bedside-Organizer/dp/B07916ZNBW (Year: 2018).*

(Continued)

*Primary Examiner* — Ingrid M Weinhold
(74) *Attorney, Agent, or Firm* — Rohm & Monsanto, PLC

(57) ABSTRACT

A multi-purpose percussion accessory stand has a primary board with a horizontal support surface or tray table, a guard board attachable at a rear edge of the horizontal support surface of the primary board, and is provided with a plurality of mounting hardware components for attaching the primary board to a variety of supports, such as the stand post of a commercially available tripod. The percussion accessory stand may be sold as a kit that includes multiple accessories, such as customized hooks, brackets, and hardware, that can be removably attached to the primary board for holding multiple implements and accessory musical instruments. The accessory stand is highly configurable, light-weight, and portable. The versatile design has a unique combination of features that are particularly useful for the genres of musical theater and chamber music.

9 Claims, 13 Drawing Sheets

(56) References Cited

U.S. PATENT DOCUMENTS

| | | | | |
|---|---|---|---|---|
| 5,069,464 A | * | 12/1991 | Braconnier | B25H 5/00 280/47.35 |
| D336,708 S | * | 6/1993 | Boughey | D34/21 |
| 5,435,448 A | * | 7/1995 | Kempen | A61M 5/1417 206/364 |
| 5,522,300 A | * | 6/1996 | Cheatwood | G10D 13/12 84/453 |
| 6,316,706 B1 | * | 11/2001 | Sammons | A47B 19/002 84/327 |
| 6,340,213 B1 | * | 1/2002 | Calobrisi, Jr. | A47B 3/12 108/25 |
| 6,360,891 B1 | * | 3/2002 | Rideout | B25H 3/00 206/372 |
| 6,563,036 B1 | * | 5/2003 | Biasini | G10D 13/12 84/453 |
| 6,604,720 B1 | * | 8/2003 | Wilson | A47B 23/04 248/177.1 |
| 6,629,506 B2 | * | 10/2003 | Park | A47B 9/18 108/156 |
| 6,629,615 B2 | * | 10/2003 | Kim | F16L 3/223 211/85.13 |
| 7,270,307 B2 | * | 9/2007 | Zodnik | E06C 7/14 248/238 |
| 7,628,186 B2 | * | 12/2009 | Blum | B25H 1/08 108/115 |
| 7,654,541 B2 | * | 2/2010 | Stengel | A47B 81/06 280/47.19 |
| 7,744,048 B1 | * | 6/2010 | McKellery | F16M 11/242 248/177.1 |
| 7,954,650 B1 | * | 6/2011 | Malik | B25H 3/04 211/70.6 |
| 8,162,156 B1 | * | 4/2012 | Crisman | G10D 13/12 211/85.6 |
| 8,167,148 B2 | * | 5/2012 | Jacobson | G10G 5/00 211/85.6 |
| 9,099,063 B2 | * | 8/2015 | Blanco | G10G 5/00 |
| 9,585,476 B2 | * | 3/2017 | Swisher | A47B 97/00 |
| 9,601,094 B2 | * | 3/2017 | Bradfield | G10G 5/00 |
| 10,709,238 B1 | * | 7/2020 | Thompson | A47B 87/0223 |
| 2002/0108918 A1 | * | 8/2002 | Pyle | G10D 13/00 211/85.6 |
| 2002/0190015 A1 | * | 12/2002 | Dietrich | B25H 3/04 211/70.6 |
| 2003/0079661 A1 | * | 5/2003 | Luu | A47B 3/08 108/116 |
| 2006/0065613 A1 | * | 3/2006 | McKay | A47F 7/02 211/85.2 |
| 2014/0217872 A1 | * | 8/2014 | Blanco | G10D 3/00 312/237 |
| 2015/0075410 A1 | * | 3/2015 | Wong | B25H 1/02 108/28 |
| 2015/0173507 A1 | * | 6/2015 | Cardon | A47B 23/06 108/26 |

OTHER PUBLICATIONS

Rdavidr; How To Make a Percussion Tray/Trap Table; Match 17, 2016; https://www.youtube.com/watch?v=ki2a_ztObVc (Year: 2016).*

Kolberg Percussion; Combination Stands; Nov. 24, 2016; https://www.kolberg.com/media/pdf/c4/21/d8/KST_Katalog_low2.pdf (Year: 2016).*

LP761; LP Performance Tray; Latin Percussion; Mar. 1, 2017; https://www.lpmusic.com/products/hardware/mounts-and-brackets/performance-tray (Year: 2017).*

* cited by examiner

MULTI-PURPOSE PERCUSSION ACCESSORY STAND

RELATIONSHIP TO OTHER APPLICATION

This application is a continuation of U.S. patent application Ser. No. 16/819,028 filed on Mar. 13, 2020. U.S. Ser. No. 16/819,028 claims the benefit of the filing date of U.S. Provisional Patent Application Ser. No. 62/818,081 filed on Mar. 13, 2019. The disclosures in the identified United States applications are is incorporated herein by reference.

BACKGROUND OF THE INVENTION

Field of the Invention

The present invention generally relates to an accessory stand, and more particularly, to a multi-purpose percussion accessory stand that facilitates the rapid exchange of various implements and instruments by a percussionist during a live performance and is particularly useful for the genres of musical theater and chamber music.

Description of the Related Art

This section is intended to provide information relating to the field and background of the invention and thus any approach/functionality described below should not be assumed to be qualified as prior art merely by its inclusion in this section.

In percussion instruments, sound is created by striking or scraping the instrument with beaters or other implements or with the hands. A typical orchestra performance commonly includes percussion instruments such as timpani, snare drum, bass drum, cymbals, triangle and tambourine. In addition, certain keyboard percussion instruments such as a glockenspiel, marimba, or xylophone are also commonly employed. This necessitates the use of multiple implements by the percussionist to strike the various instruments to produce the desired sound.

Percussion performances, particularly in the genres of musical theater and chamber music, increasingly rely on using fewer players to fill roles that had once been performed by more players. Sometimes one person has to play several instruments simultaneously, or play several written parts, seemingly at once, during a live performance. Several factors that contribute to the success of performing multiple parts in a live performance, include ease of reading the written music, ease of transition between implements, and the logic of the pre-performance setup. Setting up the percussion instruments is an important part of any performance.

For a musical performance, set up can be a complex task. Set up includes having the proper number of chairs and stands, the required music for the performance, the accessories needed for the performance and the requirements of the music, available personnel, available equipment, and available space. For the percussionist, it is a critical task which requires the instruments to be placed in a logical configuration and, preferably, within a comfortable arms reach.

In addition to the percussion instruments, all mallets, sticks, and other striking implements need to be placed within easy reach, particularly when a single person is playing such different instruments as bass drum, snare drum, suspended cymbal, and triangle all on the same part of the written music. For easy access of the different striking implements and other smaller instruments, accessory stands and trays are used. Accessory stands and trays for percussionists are well-known in the art for holding mallets and drum sticks, as well as instruments such as tambourines. During the setting up of the instruments and the accessory table, the setup must be stable so that it does not disengage or collapse during a performance. Also the accessory table must be compact so that less space is used. Large accessory tables, or multiple accessory tables, makes is difficult for the performer to access the implements or instruments and also consumes valuable space on the stage.

Over the years various types of accessory stands have been used. Initially, stands were devised to hold music sheets, leaving the hands free, to enable musicians to read sheet music or scores while playing an instrument or conducting. Various improvements have been made to music stands over the years, such as by making them foldable, detachable, lightweight, and portable.

In addition to music stands, percussionists typically require accessory stands which have been commonly in the form of tray tables. The accessory stands which may be used alongside music stands, place accessories, small instruments and implements within a convenient reach of the performer. However, known accessory stands and tray tables are sometimes large, heavy, and not easily portable. This may restrict the performer to limited usage of the stands. There is a need for a accessory stand/tray table, which is lightweight and portable, and which can be configured to conveniently hold multiple implements and instruments in a small space.

Most importantly, however, during a live performance a number of instruments and implements may be used at once, requiring easy access and the ability to safely switch from one implement or instrument to another. Switching the implements or instruments by placing them on an accessory table and picking a different implement or instrument can sometimes result in slippage of any one or more of the implements or instruments from the stand. This, in turn, disturbs the performer (and possibly the audience). There is, thus, a need to provide an accessory stand that safely secures the implements or instruments on the accessory stand while providing easy access, and preferably, access from multiple angles.

Slippage is a particular problem in some accessory stands where the top surface is hard. Implements or instruments may bounce off the table while switching. Moreover, placing the implements or instruments on a hard surface may create unnecessary noises and sounds which disturbs the performance. It is common in the music industry to place a black towel on the tray table surface to provide padding to prevent slippage. The towel also muffles any sounds that may be produced by the picking up or laying down of an implement or instrument. In addition to being unsightly, the black towel sometimes may be displaced during a live performance which can create serious problems for the percussionist. There is, therefore, a need for a percussion accessory stand that is padded and provides a means of securely holding various implements and instruments in place without fear of slippage.

Some accessory stands have provisions to secure only certain implements and have no provisions to secure other implements or instruments. In this instance, another setup may be required which leads to more consumption of space. There is, thus a need, for an accessory stand that may be configured by the percussionist to secure multiple implements and instruments of the type anticipated for various performances. For percussionists who have regular performances in different places, there is also a need for a portable accessory stand that is lightweight and compact. If the percussionist performs different programs, there is also a need for the accessory stand to be readily re-configurable.

In some cases, known accessory stands are not stable which may cause problems during a performance. There is, therefore, a need for an accessory stand with stronger fittings. There is also a need for an accessory stand that can be attached to different percussion board instruments, such as a marimba or xylophone, in different space saving positions. This is an arrangement which is not generally available commercially.

Drawbacks, including, but not limited to the aforementioned problems, such as heavy and non-portable setups, space consuming setups, improper padding of surfaces which permits slippage of instruments and also unnecessary sounds, unstable attachments, and mountings which are not re-configurable or suitable for a multiplicity of implements or instruments, are present in existing accessory stands and tables.

This results in a need for a highly configurable accessory stand that will facilitate the rapid exchange of various implements and instruments by the percussionist during a live performance, which is designed to have a unique combination of features that are particularly useful for the genres of musical theater and chamber music. Of course, there is also a need for a versatile percussion accessory stand which is applicable to other musical genres and of general utility.

One of the main objects of the present invention is to provide a percussion accessory stand that gives percussionists ready access to multiple implements and instruments during a live performance.

Another object of the present invention is to provide a percussion accessory stand that has a unique combination of detachable accessories that are particularly useful to hold multiple implements and instruments used for the musical genres of musical theater and chamber music.

A further object of the present invention is to provide a percussion accessory stand that has universal mounting hardware that can be fitted on stands that are already used in musical industry.

It is still a further object of the present invention to provide a percussion accessory stand that has rattle-free/noise dampening and non slippage arrangements.

It is still yet a further object of the present invention to provide a percussion accessory stand that has a plurality of mounting hardware and inserts which allows it to be attached in different positions to other instruments and stands.

It is still yet another object of the present invention to provide a percussion accessory stand that can be provided as a kit which includes, in addition to mounting hardware, a variety of accessories, such as hooks and props, for securing and holding a variety of percussion implements and/or instruments to the accessory stand in a manner that is highly configurable by the percussionist.

It is still yet a further object of the present invention to provide a percussion accessory stand that is lightweight, portable and self-contained.

These and other objects, features and advantages of the present invention will become more apparent from the following description when read in conjunction with the accompanying drawing which shows, for the purpose of illustration only, certain preferred embodiments in accordance with the present invention.

SUMMARY OF THE INVENTION

The foregoing and other objects are achieved by this invention which provides a multi-purpose percussion accessory stand for temporarily holding a plurality of implements and/or accessory percussion instruments. The multi-purpose percussion stand of the present invention overcomes many of the problems of conventional stands used for holding percussion accessories. While the term multi-purpose percussion stand has been used to describe the invention in general, it is to be understood that the term includes multiple components that may be sold in kit form or ala carte, that comprise the highly-configurable arrangement that can be assembled by a percussionist to suit the individual need.

The multi-purpose percussion accessory stand assembly of the present invention has four main components. Of course, the assembly has a horizontal support surface, or tray table, designated herein as the primary board for temporarily holding a plurality of implements and/or percussion instruments. A guard board may be attached, preferably to the rear edge of the primary board, for safely holding implements and percussion instruments in place, and at a convenient angle to assist pick up by the percussionist. The guard board may be, in some embodiment, pivotally attached to the primary board by a double-hinged connection. In other preferred embodiments, the guard board, which may comprise more than one piece as will be described below, is attachable to the primary board by fasteners, such as thumb screws, which secure the guard board to the primary board. The percussion accessory stand assembly also includes a plurality of mounting hardware for attaching the primary board to various supports/stands and a plurality of accessories that can be removably attached to the primary board for hanging or otherwise holding a variety of percussion implements and other percussion instruments.

The primary board of the percussion accessory stand of the present invention is an upholstered lightweight board which may be, in certain preferred embodiments, sourced from inexpensive materials, such as plywood, pressboard and fiber board. The primary board is designed to be rattle-free and eliminate noise while placing the percussion implements and/or instruments thereon. The upholstered surface also promotes non-slippage of the implements or percussion instruments. The upholstered surfaces eliminates the need for the unsightly black towel as commonly used in the industry to provide padding on an accessory stand. Glow tape can be provided on the front and top corners of the primary board to facilitate use in low light.

The underside of the primary board includes a threaded flange which accommodates a mounting post which preferably is of a diameter which is commonly used in the industry so that the flange and/or mounting post is compatible with commercially available equipment such as a tripod. The underside of primary board also includes internally-threaded inserts which are installed underneath the front edge of the primary board for receiving externally-threaded accessories for holding implements and/or percussion instruments along the front edge (user side) of the primary board. In an illustrative embodiment, at least three threaded inserts are provided and are spaced equidistantly apart.

The upper side of the primary board also includes multiple internally-threaded inserts installed on each of the right and left side edges of the board for mounting to compatible externally-threaded accessories. In preferred embodiments, seven evenly spaced inserts provide flexibility in the placement of accessories by the percussionist. These accessories include, for example, hooks, fasteners, brackets, and a removable carrying handle.

In preferred embodiments, the rear edge of the edge of the board has at least four centered internally-threaded inserts for securing the attachable guard board, or boards, in a vertical position. If the guard board is not required, or is in the way of the implements or instruments being placed on the top surface of the primary board, there are at least four centered internally-threaded inserts on the rear underside of the primary board that can be used to secure the guard board(s) underneath the primary board in a horizontal unused position.

In addition to the foregoing, the upper side of the primary board has at least four vertically-oriented openings, that may preferably contain internally-threaded inserts one of which is placed in each top corner of the primary board to receive accessories or other implements. In one preferred embodiment, the vertically-oriented openings accommodate posts, which may be externally-threaded posts which are compatible with the inserts. As described more completely below, the posts can be used to support a second primary board in a stacked configuration. It is also to be understood that the hardware supplied with the assembly of the present invention can be used to connect two or more primary boards horizontally contiguous to each other.

The attachable, or deployable, guard board of the percussion accessory stand assembly of the present invention prevents items that are placed on the horizontal primary board surface, or tray table, from falling off the back side. Of course, the guard board can be mounted on a side edge of the primary board in this highly configurable assembly.

An advantageous feature of the guard board of the present invention is that the upper edge of the guard board has a plurality of, and preferably three or five, semi-circular cut outs resulting in a scalloped upper edge portion receiving and retaining certain implements, such as mallets or drum sticks at an advantageous angle that permits easy pickup during a performance. In order to minimize slippage and reduce contact noise, the guard board preferably has a rubberized coating and noise-reducing matte black wrapping. For even greater noise reduction, strips of felt padding are applied to the front of the top edge to prevent contact noise. Strips of glow tape can be applied to the top corners of the guard board to facilitate use in low light.

The mounting hardware provided for use with the percussion accessory stand assembly of the present invention enables the primary board to be attached on the top and the sides of stands and other musical instruments for a conservative use of space. Specific examples, include mounting to snare stands and percussion keyboard end-frames. The mounting hardware provided with the assembly, or kit, comprises primary mount components, which can be used, for example, for constructing a rattle-free keyboard end frame suspension system, and a plurality of Z-shaped brackets.

The primary mount components include a threaded mounting post which attaches to the flange on the underside of the primary board and is usable with stands, such as a tripod stand, having a similar post size. In certain preferred embodiments, the threaded mounting post can be terminated on one end with a multi-stop threaded insert so that it can be attached to stands of a different diameter.

Aluminum boom rail or rails are extremely versatile components of the mounting hardware. The aluminum boom rail, which may be a C-channel rail having openings, or slots, on the central portion, can be used to set up the rattle-free keyboard end frame suspension arrangement described below so that the primary board can be supported by a vertical surface. The openings permit the use of fasteners, such as threaded thumb screws which are provided as part of the hardware components, to secure the boom rail to the primary board in multiple locations. The slots also enable the aluminum boom rail to be connected to other components, such as pipe clamps, which can in turn be connected to still further components, such as the stand post.

As part of the versatility of the aluminum boom rail, the rail can be mounting on an upper surface of the the primary board such that the C-shaped channel holds a tablet or iPad at an angle to display music and facilitate the player's ability to interface with the tablet.

The multi-purpose percussion accessory stand assembly, which is preferably provided in kit form, includes a plurality of accessories, some of which are attachable to the edges, or top or bottom, of the primary board to enable the percussionist to secure and hold a maximum number of implements and/or instruments on a single stand. The accessories include a plurality of hooks, herein termed switch hooks, which are partially threaded aluminum dowels that have a slight upward bend at the end distal to the threaded portion. The switch hooks can be removably attached to the primary board in any one of the internally-threaded inserts on the side edges of the primary board.

Other accessories include a plurality of L-shaped brackets, that are particularly useful as side guard brackets. In this instance the L-shaped bracket is affixed to the underside of the primary board such that the long leg of the brackets extends perpendicular to the primary board top to prevent implements placed on the top from falling off the edge. Further, if needed, two of the L-shaped brackets can be fastened together to form a U-shaped bracket that may be useful in some embodiments. A plurality of Z-shaped brackets are provided for mounting to the underside or topside of the primary board. When four of the Z-brackets are mounted near the corners of the primary board, they can form a raised support for objects, such as a laptop (topside) or a support for placing the primary board on other instruments, as will be described in greater detail below.

Other accessories preferably include semi-circular props that can be removably attached to the top surface of the primary board to hold lengthy instruments, such as a rainstick. Of course, miscellaneous hardware and fasteners, such as wing nuts, bolts, and a wrench are included. The accessory components can be made of nylon or metal, and if metal, preferably lightweight metal, such as aluminum, for easy portability. In this regard, the accessories include a carrying handle that can be removably attached to one side of the primary board and a water-resistant nylon slip-on travel bag, as well as an accessory pouch to corral small objects.

One of the main advantages of the present invention is that the percussion accessory stand assembly is portable, lightweight and the components can be fully packed up after use into a self-contained setup which fits conveniently into a slip-on bag.

BRIEF DESCRIPTION OF THE DRAWING

Comprehension of the invention is facilitated by reading the following detailed description, in conjunction with the annexed drawing, in which.

Figure 1:
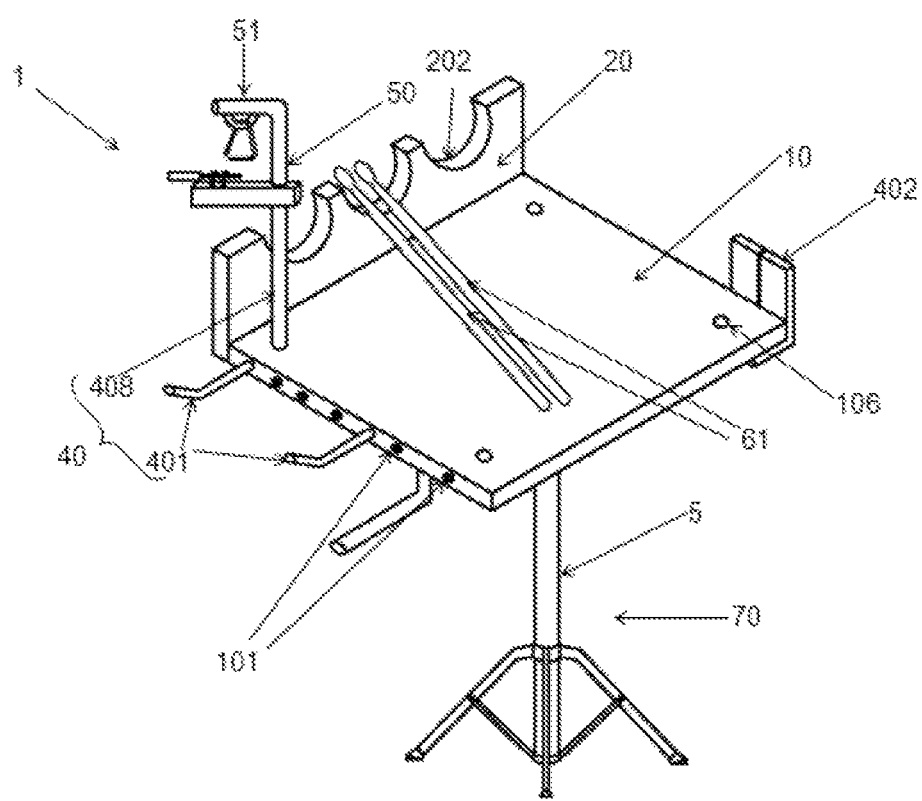
FIG. 1 is a a schematic diagram showing a perspective view of the multi-purpose percussion accessory stand assembly of the present invention fitted with multiple detachable accessories for holding percussion implements and/or percussion instruments.

Skilled artisans will appreciate that elements in the drawings are illustrated for simplicity and may not have been necessarily been drawn to scale. Furthermore, in terms of the construction of the product, the components of the invention been represented in the drawings by conventional symbols. The drawings may show only those specific details that are pertinent to understanding the embodiments of the present invention so as not to obscure the drawings with details that will be readily apparent to those of ordinary skill in the art having benefit of the description herein. The objective is to promote an understanding of the components, their arrangement, and their function.

DETAILED DESCRIPTION

For the purpose of promoting an understanding of the principles of the invention, reference will now be made to the embodiment(s) illustrated in the drawings and specific language will be used to describe the same. This description is provided for purposes of illustration only and is not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment," "in another embodiment," and similar language throughout this specification may, but do not necessarily, all refer to the same embodiment.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, the term "and/or" includes any and all combinations and arrangements of one or more of the associated listed items.

Unless otherwise defined, all technical and scientific terms used herein have the same meaning as commonly understood by one of ordinary skill in the art to which this invention belongs.

Any headings provided herein are for convenience only and do not necessarily affect the scope or meaning of the claimed invention.

Embodiments of the present invention will be described below in detail with reference to the accompanying drawings.

The detailed description of the multi-purpose percussion accessory stand and objects of the present invention will be made in accordance with the identification of components that form the basis of the figures described above.

After observing all of the aforementioned problems in the prior art, the percussion accessory stand assembly of the present invention has a unique combination of features that are highly configurable by the percussionist, and which are particularly useful in the genres of musical theater and chamber music, to facilitate the rapid exchange of various implements and instruments by the percussionist in comparison to conventional stands.

FIG. 1 shows the multi-purpose percussion accessory stand assembly (1) where the primary board (10) is mounted on top of a stand post (5) of a tripod (70) and the primary board (10) is fitted with multiple detachable accessories, herein referred to collectively as accessories (40), for holding percussion implements and/or percussion instruments. Accessories 40 illustratively include switch hooks (401), threaded post (408), and side guard brackets (402), as shown in this figure.

The primary board (10) is the horizontal support surface or tray/table of the multi-purpose percussion accessory stand of the present invention. The primary board is preferably constructed from a lightweight board made of a material such as plywood, press board or fiber board. In the particularly preferred embodiment, the primary board (10) is upholstered, preferably with a dark material (i.e., black or gray) so as to be unobtrusive on stage and to damp sounds, and incorporates various advantageous features of the present invention.

Figure 3:
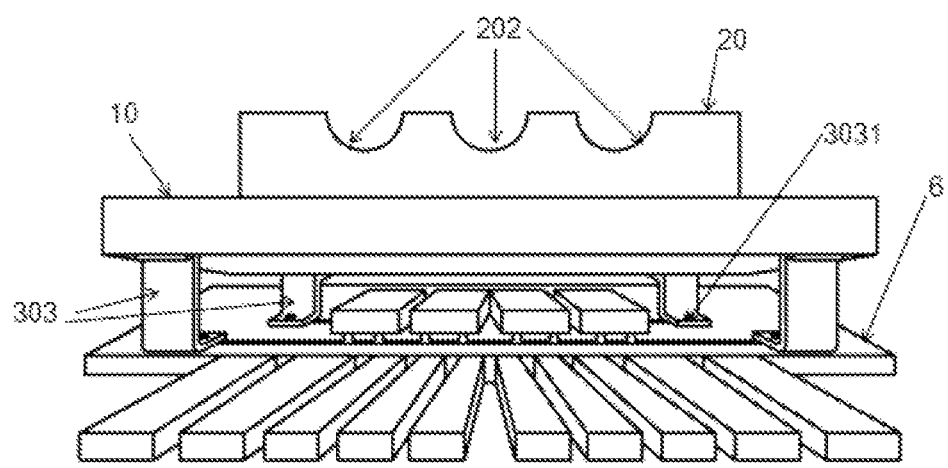
FIG. 3 is a schematic diagram showing a perspective view of the primary board of the present invention perched on a board type percussion instrument with the front edge parallel to the percussion instrument.
Figure 4:
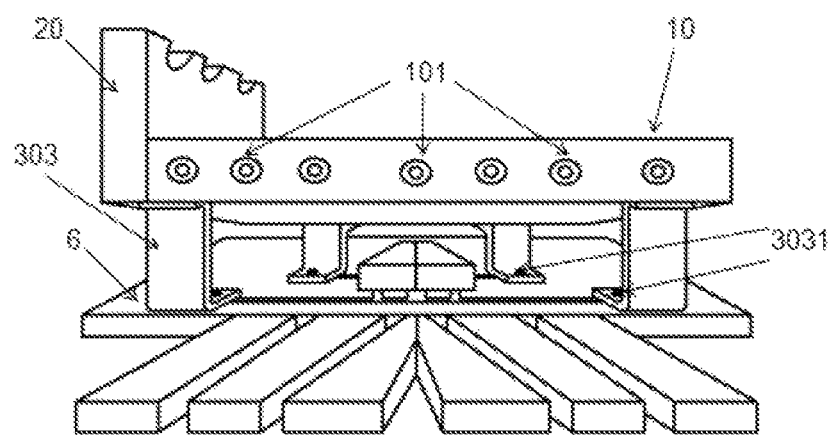
FIG. 4 is a schematic diagram showing a perspective view of the primary board of the present invention perched transversely up on a board type percussion instrument.

In a specific preferred embodiment of the invention, primary board (10) measures 18"×12"×¾". While the size of the primary board can be varied, these particular dimensions allow the percussion accessory stand assembly (1) to be easily stowed in commercially available cymbal bags, trap cases, and large mallet bags. The primary board (10) includes multiple internally-threaded inserts (101) and flanges for mounting the primary board (10) on a stand post (5) as shown in FIG. 1 or on instrument boards (6) as shown in FIG. 3 and FIG. 4. Multiple inserts and flanges are used also to fit multiple detachable accessories (40) to the primary board (10).

Figure 5:
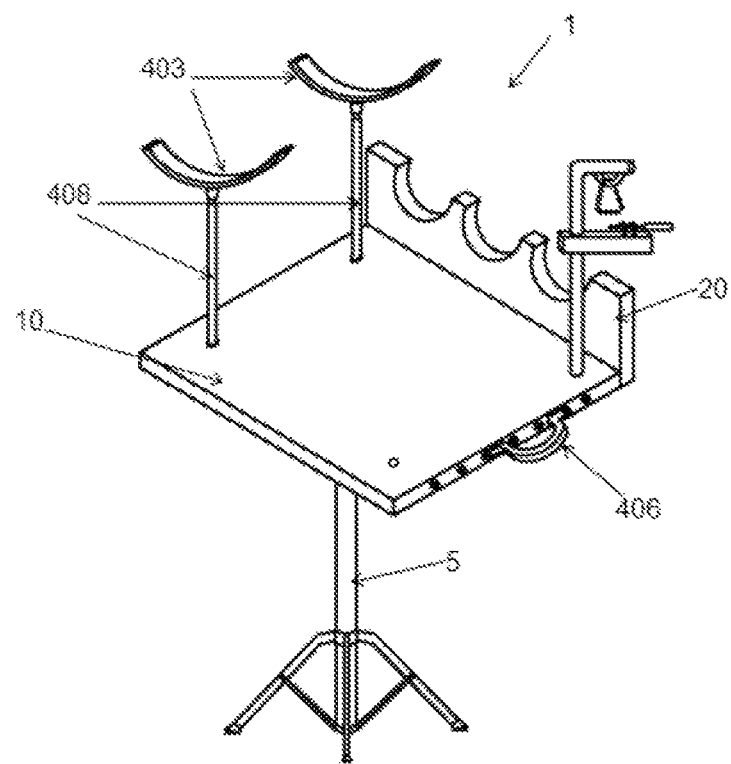
FIG. 5 is a schematic diagram shwoing a perspective view of the multi-purpose percussion accessory stand equipped with semi-circular props for holding lengthier instruments and implements.
Figure 8:
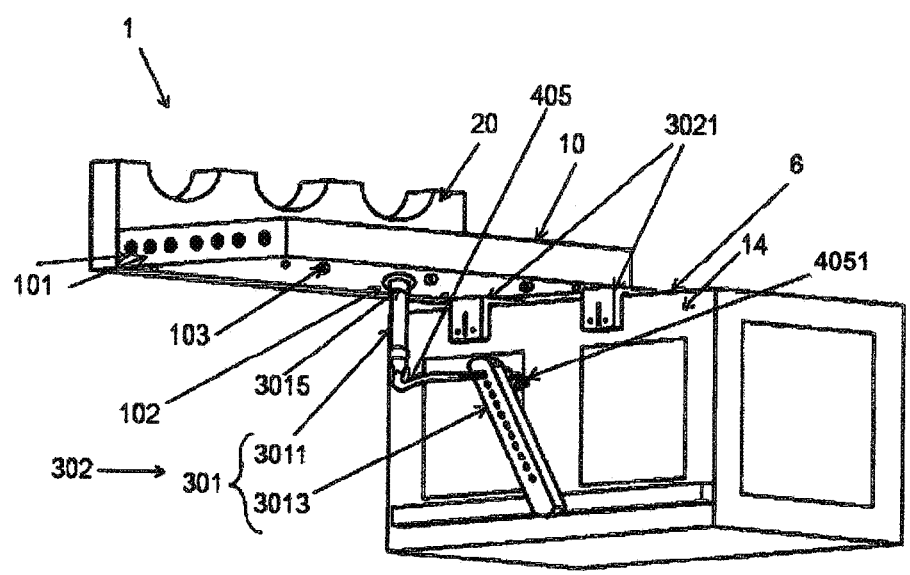
FIG. 8 is a schematic diagram showing a bottom perspective view of the primary board of the multi-purpose percussion accessory stand of the present invention mounted on the side of the board type percussion instrument.

In a preferred specific embodiment of the primary board (10) of the multi-purpose percussion accessory stand assembly (1), there are seven evenly spaced 3/16" internally-threaded inserts (101) which are provided on each of the respective right and left side edges (12" edges in this embodiment) of the primary board (10) as shown in FIG. 1, FIG. 4, and FIG. 8. Threaded inserts (101) provide a receptacle for mounting a plurality of accessories (40) and for attaching a carrying handle (406) on one edge as shown in FIG. 5. Of course, the number of inserts is illustrative. However, seven is the maximum number of evenly spaced inserts for a primary board dimensioned as per this example. The spacing should allow implements and instruments to be placed on the accessories without incidence or making noise.

Figure 2:
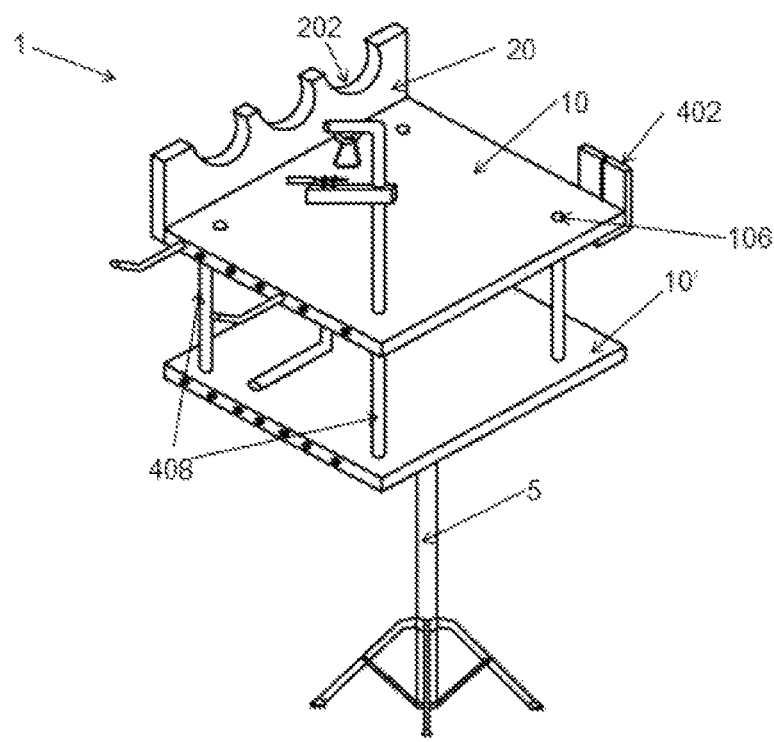
FIG. 2 is a schematic diagram showing a perspective view of the multi-purpose percussion accessory stand of the present invention showing a second primary board stacked above the first primary board.
Figure 11:
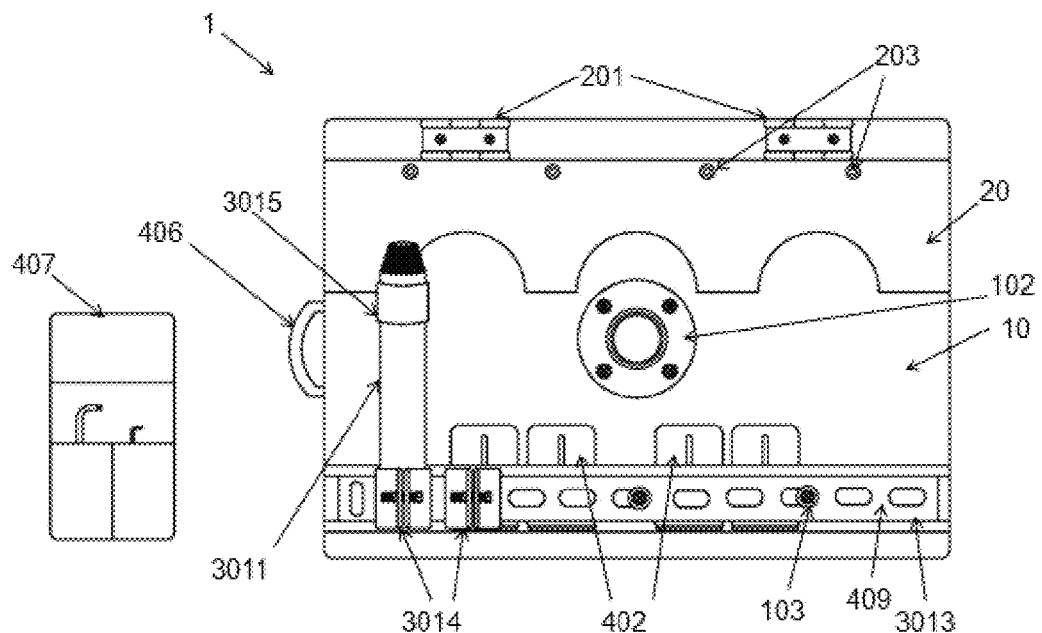
FIG. 11 is a schematic diagram showing a bottom view of the primary board of the multi-purpose percussion accessory stand of the present invention in a self-contained configuration along with an accessory pouch.
Figure 12:
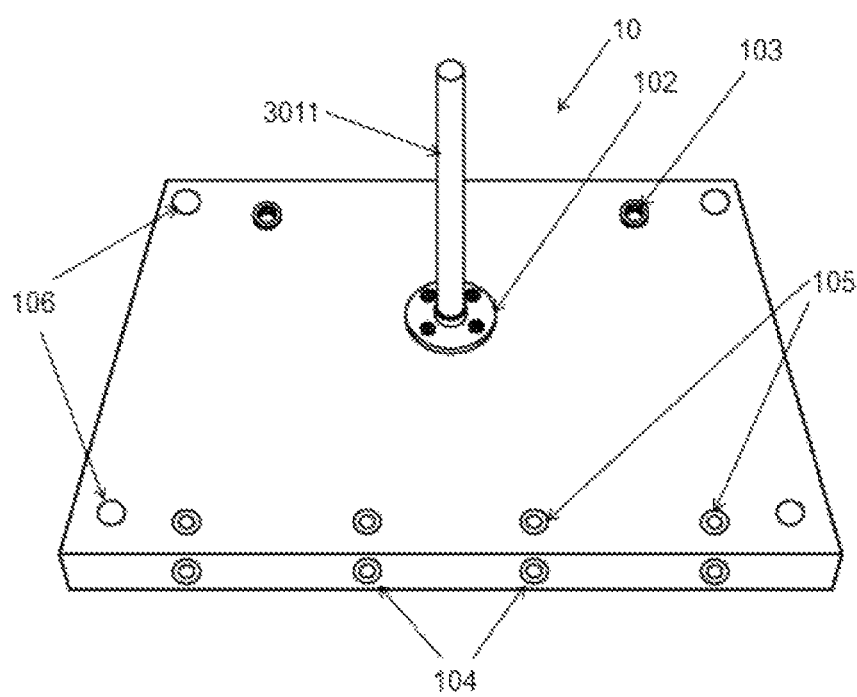
FIG. 12 is a schematic diagram showing a rear bottom perspective view of the primary board with the mounting post.

There is a threaded flange (102) attached to the center of the underside of the primary board (10) as shown best in FIG.12 to attach to, in some embodiments, the 1" diameter stand post of a tripod (70) as commonly used in the industry and as shown in FIG. 1, FIG. 2, and FIG. 5. However, as will be described in greater detail with respect to kit components, a 1" diameter mounting post (3011) (FIG. 12; FIG. 8, and FIG. 11) may be provided as part of the collectively described mounting hardware that is provided in the kit.

Three 3/8" internally-threaded inserts (103) are provided underneath the front edge (18" edge) on the user's side, two of which are visible in the illustration of FIG. 12. In this embodiment, the internally-threaded inserts (103) are spaced equidistantly for mounting accessories (40) underneath the primary board (10) such as appropriately threaded accessories, such as hooks, that may be provided as part of the kit components.

Four equally spaced apart internally-threaded inserts (104) on the back edge (3/4" edge) of the rear edge (18" edge) are provided to secure the guard board (20), as shown in FIG. 1 and FIG. 2, for example, in its vertical, active position. Guard board (20) will be described in more detail below. Four internally-threaded inserts (105) are provided on the rear underside of primary board (10), as shown in FIG. 12, to secure the guard board (20) in its horizontal, offline/unused position (not shown in this figure; see FIG. 11). Four vertically-oriented openings, one at each corner of the primary board (10), are accessible from above and below. Illustratively 3/8" internally-threaded inserts (106) are provided in the openings to accommodate externally-threaded accessories. The primary board (10) is preferably equipped with glow tape markings (not specifically shown in the figures) at the front and top corners to facilitate use in low light situations.

FIG. 2 shows the multi-purpose percussion accessory stand assembly (1) with a primary board (10) stacked above another primary board (10') and with a plurality of accessories (40). The four vertically-oriented 3/8" threaded inserts (106) allow any 3/8" post (408) with the proper thread count to be mounted on the primary board (10') in a vertical orientation, including the instruments and implements, collectively referred to herein as instruments and implements (50). For purposes of illustration, an instrument (50) is shown in the form of the ubiquitous Miller Machine triangle (51) in FIG. 1, FIG. 2 and FIG. 5. Of course, triangle (51) could also be a finger cymbal trigger. The 3/8" metal threaded posts (408) may be used for hanging instruments and stacking hardware. The stacking of primary boards (10 and 10') is a particularly advantageous feature as shown in FIG. 2, where multiple primary boards (10) are stacked on a single stand post (5) using the four threaded posts (408) in the corner inserts (106) thereby doubling the space for placing instruments and hardware. Of course, if properly supported more than one additional primary board could be so stacked.

It is also to be understood that the hardware supplied with the assembly of the present invention can be used to connect two or more primary boards horizontally contiguous to each other. Although not shown in the figures, a person of ordinary skill in the art will understand that an aluminum boom rail (3013) can be mounted to the underside of two primary boards to connect them together.

Guard board (20) of the multipurpose percussion accessory stand assembly (1) is deployed in its upright position at the rear edge of the primary board (10) as shown in FIG. 1. In this illustrative embodiment, guard board (20) has three evenly spaced semi-circular cut-outs (202) forming a scalloped edge to keep implements in place. In this specific embodiment, the three evenly spaced semi-circular cut-outs (202) have a 1.5" or 2" radius. The large size of the cut-outs (202) is particularly useful for retaining pairs and sets of implements horizontally so that the implements and instruments are prevented from falling off the primary board (10). For example, implements like the pair of drum sticks (61) as shown in FIG. 1 is placed on the primary board (10) with the front portion of the drum sticks (61) resting on one of the semicircular cut-outs (202). When the guard board (20) is not in use, it can be flipped down and held parallel to the underside of the primary board (10) so that lengthier objects can be placed safely on the primary board (10) without obstruction. To avoid unnecessary noise from the guard board (20) while placing an instrument or implement, the guard board (20) is preferably covered by a rubberized coating and noise-reducing, matte black wrapping (not clearly shown in the figures) thereby dampening the noise. Strips of felt padding (also not shown in the figures) may also be deployed at the front of the top edge to dampen or eliminate contact noise and to reduce or eliminate slippage of the implements from the cutouts (202).

In some embodiments, two double-hinged connections (201) are mounted on the long dimension of the primary board (10) on the rear edge which connects the guard board (20) to the primary board (10) and permits the guard board (20) to swing 270 degrees from perpendicular to the top/rear edge, where it acts as a prop to allow easy access to implements, to parallel to the underside/rear as shown in FIG. 11 which shows the hinges (201) and the guard board (20) held parallel to the back side of the primary board (10) for transit. Glow tape markings (not shown in the figures) may be provided in the top corners for easier navigation in low light situations. Four internally-threaded inserts on the lower rear center of the guard board (20) allows the guard board (20) to be secured into its upright position or alternatively to be secured to the underside of the primary board (10) with thumb screws (203) as shown in FIG. 11 in configurations where the guard board (20) is not desired to be used or when it is to be packed up for transit.

Figure 6:
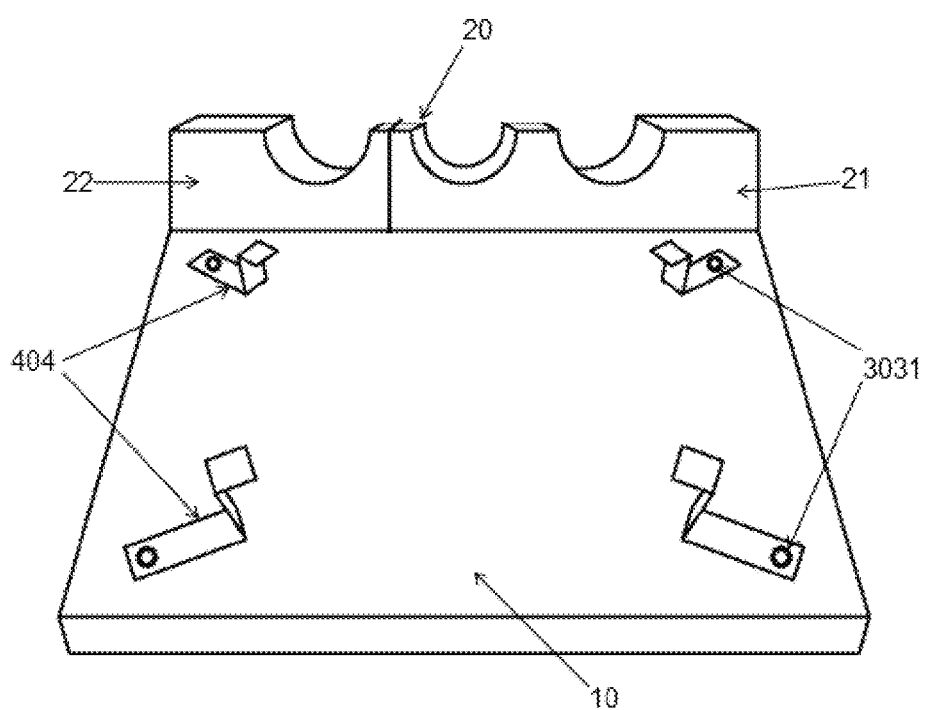
FIG. 6 is a schematic diagram showing a top perspective view of the primary board of the multi-purpose percussion accessory stand of the present invention with detachable Z-shaped brackets.

As shown in the FIG. 1, for example, guard board (20) is a unitary generally rectangular board having three semicircular cut-outs. However, in an alternative advantageous embodiment, shown in FIG. 6, the guard board (20) can be split into more than one piece. In the embodiment of FIG. 6, the two pieces (21, 22) are split 60/40 percent. In a particularly advantageous embodiment (not shown), there are five semi-circular cut-outs in total on the two pieces so that the 60/40 split results in three semi-circular cut-outs on one piece and two on the other piece. The advantage of the split guard board is that one of the guard boards can be left off the setup arrangement so that larger implements can be laid on the primary board (10) without interference by the guard board. Of course, guard board (20) and/or one or more of its pieces, can be affixed to the lateral side edges of the primary board for even more versatility.

The primary board (10) is provided with multiple flanges and inserts for attaching the primary board (10) to stand post (5) and for securing multiple detachable accessories (40). The threaded flange (102) mounted at the center of the underside of the primary board (10) as shown in FIG. 11 is provided to attach to a threaded mounting post (3011), and in practical embodiments, a 1 inch diameter mounting post (3011) as commonly used in the industry. In the preferred embodiment, the plurality of mounting hardware components described herein as part of the percussion accessory stand assembly (1) of the present invention would be sold together as a kit. Of course, the components can be sold separately to allow the percussionist to configure the stand assembly (1) in a variety of unique ways and to replace lost or stolen accessories (40).

The plurality of mounting hardware of the preferred embodiment consists of primary mount components (301) and Z-shaped brackets (303) which can be used for attaching the primary board (10) to the top or the side of keyboard percussion instruments such as marimbas. In one example, primary mount components are used to construct the rattle-free keyboard end frame suspension setup (302) shown in detail in FIG. 8.

The primary mount components, collectively referred to herein as primary mount components (301) of the mounting hardware, further consists of 1" threaded mounting post (3011) which screws into the threaded flange (102) provided on the underside of the primary board (10) shown in FIG. 12. Mounting post (3011) is sized to easily accommodate common existing multi-clamps of the type commonly sold by most drum hardware manufacturers for attaching and mounting drums, cymbals, and accessories and is also sized to fit into common cymbal stands and tom mounting brackets. The threaded mounting post (3011) is fitted with a 1" long nylon barrel washer (3015) having an outer diameter greater than 1" and with a 1" bore sized to receive the threaded mounting post (3011) to allow for more mounting options. Referring to FIG. 8, mounting post (3011) is employed as part of a setup where the accessory stand is cantilevered against the end board of a percussion keyboard instrument which is a marimba (6) in the illustrative embodiments herein.

Figure 9:
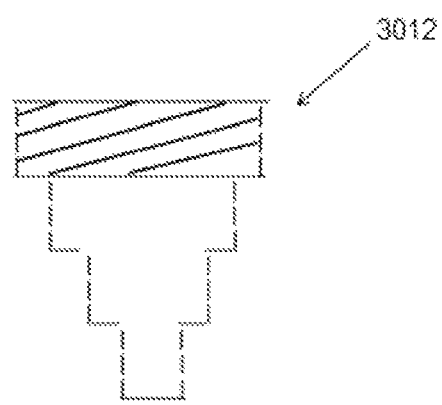
FIG. 9 is a schematic diagram showing a front view of a multi-stop threaded mounting post of the present invention.

The primary mount components (301) may further consist of a multi-stop threaded mounting post insert (3012) as shown in FIG. 9 that has stacked stops of deceasing diameters which are chosen to adapt the 1" threaded mounting post (3011) to fit the most common diameters of stand posts (5) sold by different manufacturers of cymbal stands.

FIG. 8 shows an aluminum boom rail (3013) of the primary mount components (301) mounted to the end board (14) of a marimba (6). Aluminum boom rail (3013) is also shown clearly in FIG. 11. A preferred special feature of aluminum boom rail (3013) is the inclusion of rubber end caps (not shown) which provide grip for the boom rail and reduce marring. The aluminum boom rail (3013) can also be mounted to the front top surface of the primary board (10) such that the C-shaped channel (409) of the aluminum boom rail holds a tablet or iPad at an angle to display music and facilitate the player's ability to interface with the tablet (not shown in the figures).

The primary mount components (301) further includes at least two pipe clamps (3014). Pipe clamps 3014 can be used to join the aluminum boom rail (3013) to the mounting post (3011) of the primary board (10) as shown in the embodiment of FIG. 8. Nylon wing nuts (shown, for example, in FIGS. 10 and 13) are included for easy adjustment and secure attachment of the pipe clamps (3014) or the insulated hook (405).

Figure 13:
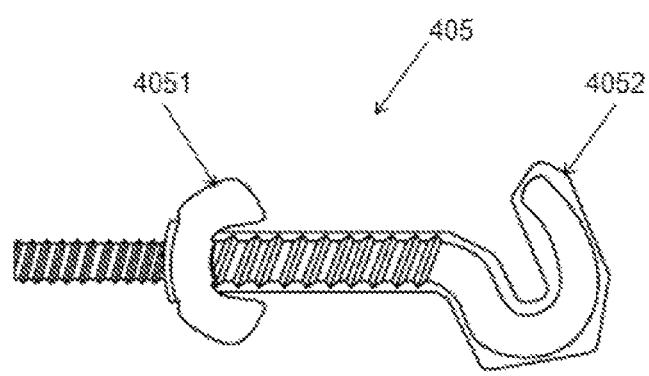
FIG. 13 is a schematic diagram showing a front view of an insulated J-hook in accordance with the present invention.

The primary mount components (301) of used to construct the rattle-free keyboard end frame suspension setup (302) are shown in FIG. 8 which is an illustrative suspension system comprising the threaded mounting post (3011) as affixed to the underside of the primary board (10), connected to an aluminum boom rail (3013), using an insulated hook (405) as shown in detail in FIG. 13. The hook end of insulated hook (405) is inserted into mounting post (3011). The threaded end of insulator hook (405) passes through one of the slots in the aluminum boom rail (3013) and is secured to boom rail (3013) by a wing nut (4051). U-shaped brackets (3021) are attached to the underside of the primary board (10) and fitted over the top of the end board (14) of a marimba (6). In combination with the remaining elements of the suspension system, the U-shaped brackets (3021) brace the primary board (10) against the marimba end board (14) in a cantilevered manner. The U-shaped brackets (3021) can be assembled by attaching two of the felt padded L-shaped side guard brackets (402) that are included in the kit to form a U shape.

The mounting hardware also includes marimba bar cord "skids" which allow perching of the primary board (10) above the bar suspension rope of the keyboard accidentals of the marimba (6) (FIG. 4) or on the horizontal rails themselves as shown in FIG. 3. The skids, which are four Z-shaped brackets (303 or 404), are mounted to the underside of the primary board (10) at 45 degree angles on each of its four corners. The skids are best shown in FIG. 6. Further, for mounting on the marimba, the skids would be oriented parallel to the front and back edges of the primary board (10) as shown in FIG. 3 and FIG. 4.

FIG. 3 shows the primary board (10) perched on the marimba (6) with the front edge parallel to the marimba (6) by the Z-shaped brackets (303) such that the primary board (10) faces the user. FIG. 4 shows the primary board (10) perched transversely up on the board type percussion instrument marimba (6) by the support of Z-shaped brackets (303) such that the side of the primary board (10) faces the user.

Figure 7:
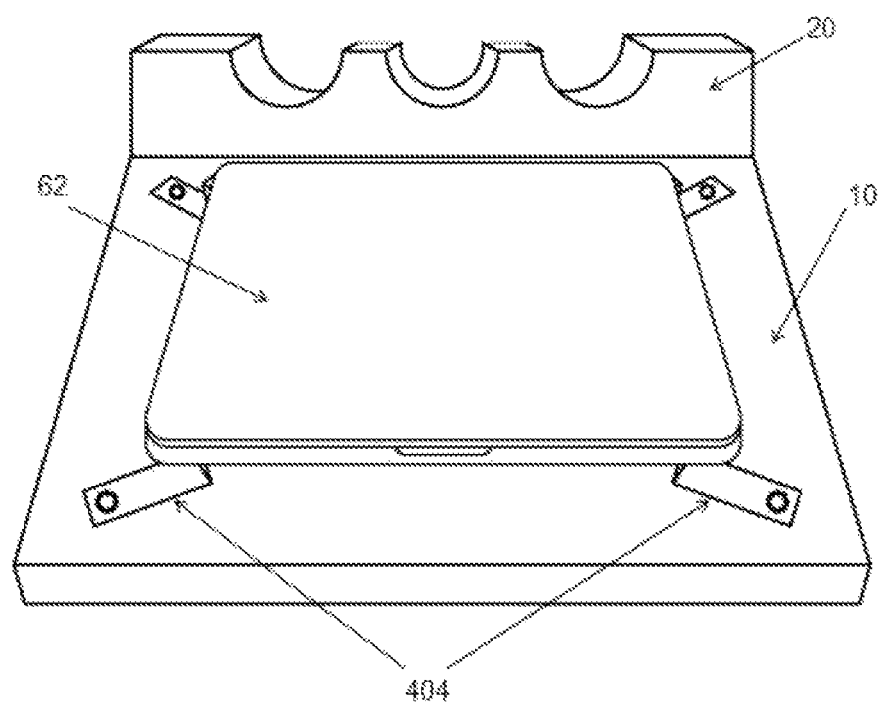
FIG. 7 is a schematic diagram showing a top perspective view of the primary board of the multi-purpose percussion accessory stand of the present invention holding a laptop.

FIG. 6 shows the primary board (10) having detachable accessories (40) which are four Z-shaped brackets (404) mounted on the four threaded inserts (106) present on top corners at 45 degree angles of the primary board (10). FIG. 7 shows a laptop (62) placed on the Z-shaped brackets (404) which are mounted on the primary board (10). The Z-shaped brackets (404) have non-slip coating to prevent marring and to hold the laptop (62) more securely. Advantageously, the brackets (404) hold the laptop (62) in a raised position to mitigate overheating. Four ⅜" black nylon bolts (3031) are provided for affixing the Z-shaped brackets (404) to the primary board (10).

Figure 10:
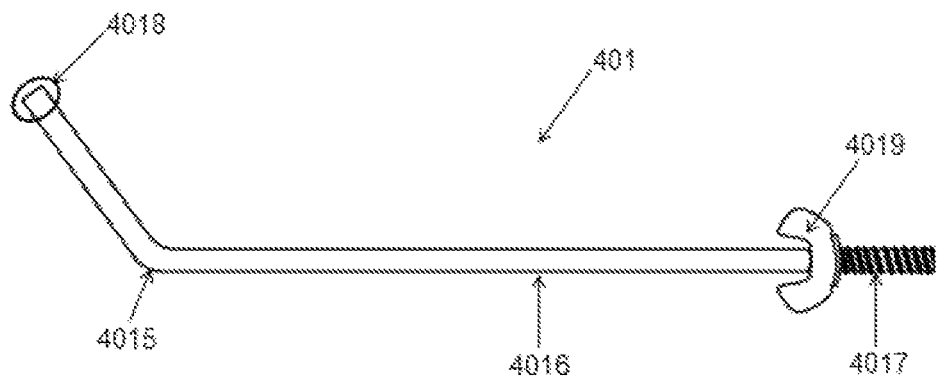
FIG. 10 is a schematic diagram showing a front view of a switch hook of the present invention.

FIG. 10 shows detailed view of one of switch hooks (401) which are another type of detachable accessories (40). Switch hooks (401) are partially threaded aluminum dowels (4016) having a slight bend (4015) at the end distal to the threaded portion (4017). These hooks (401) are threadably attachable to any one or more of the seven evenly spaced 3/16" threaded inserts (101) on the respective right and left side edges of the primary board (10) as described above and as shown in FIG. 1. The nylon wing nuts (4019) shown in FIG. 10 secure the switch hooks (401) against rotation once positioned. The switch hooks (401) may be spaced approximately 1" apart to permit percussion mallets, e.g., timpani or keyboard percussion mallets, to be hung by their heads. Alternatively, implements and instruments can be laid on top of the switch hooks (401). The 1" bend at the end ensures that anything laid on top does not roll over the edge. Of course, the hooks (401) can be spaced further apart, if desired, and used to hang any implements that have an eyelet or a strap. The switch hooks (401) are approximately 6" long with a slight upward bend at the last 1" and are preferably terminated with a ¾" rubber cap (4018). The threaded portion of the switch hook (401) is preferably coated with non-slip, matte-black material to prevent unwanted rotation.

Felt-padded steel 2x3 L-shaped side guard brackets (402) as shown in FIG.8 and FIG. 11, can be attached to the underside of the primary board (10) so that the long leg of the bracket (402) extends perpendicular to the primary board (10) top so that implements do not fall off the side edge as shown in FIG. 1. These L-shaped brackets (402) were also used to form the U-shaped brackets (3021) that fit over the end board (14) of a marimba (6) in the suspension system shown in FIG. 8.

FIG. 5 shows the primary board (10) fitted with semicircular props (403) in the top side ⅜" internally-threaded inserts (106). Props (403) are used for holding lengthier instruments and implements. The semicircular props (403), preferably rubber-lined, are attachable to the primary board (10) with the ⅜" metal threaded posts (408) provided with the kit, as shown in FIG. 5, and can be used to elevate one or both sides of large implements such as a bass drum mallet, bass bow, rainstick, and the like (not shown).

Other detachable accessories (40) within the contemplation of the invention include ⅜" insulated hook (405) with nylon nut (4051) as shown in FIG. 13. Nut (4051) secures the rotational position of the hook as used in the illustrative mounting configuration of FIG. 8. A hook with nylon loop for suspending triangles and small, resonant items is within the contemplation of the invention. A carrying handle (406) as shown in FIG. 11 is attachable to one of the short edges (12") of the primary board (10) via 3⁄16" thumb screws with rubber washers. The handle can also be used to hang objects that have a hook built into them. A water-resistant nylon slip-on travel bag/cover (not shown in the figures) that has an opening at top of the bag allows the percussion accessory stand assembly (1) to be carried via its handle (406).

A wrench (not shown in the figures), preferably a low-profile wrench, for adjusting the nylon bolts and metal and nylon nuts used in assembling the percussion accessory stand assembly (1) of the present invention is also provided. The wrench is securable to the underside of the primary board (10) with velcro strips, for example. An accessory pouch (407) as shown in FIG. 11 corrals accessories (40), such as the switch hooks (401), large insulated hook (405), and Z-shaped brackets (404), as well as smaller components, for travel. Accessory pouch (407) also provides a place to store unused accessories (40).

FIG. 11 shows the percussion accessory stand assembly (1) of the present invention fully packed up into a self-contained configuration for easy portability. All the components are securely packed to avoid losing the accessories (40). The full left/right symmetry of percussion accessory stand assembly (1) allows use by all performers in spaces with different space constraints. The primary board (10) is mountable at 180 degrees from the standard position which is particularly advantageous for lower mounting positions and different angles of access. The mounting hardware saves floor space in setups, including mounting to snare stands and keyboard end boards which are both are better ways to harness these objects. The substantial options for mallet placement and suspension via switch hooks (401) on the side of the primary board allows full use of the surface for other purposes.

FIG. 12 shows the primary board (10) in an inverted position from the rear side, with the mounting post (3011) inserted in the threaded flange (102). The four centered threaded inserts (104) on the rear edge (18" edge) and the four threaded inserts (105) of the center of the rear underside of the primary board (10) are clearly shown. Opposite to the threaded inserts (105), the threaded ⅜" threaded inserts (103) are provided. The four vertically-oriented ⅜" threaded inserts (106) are placed on each corner of the primary board (10).

FIG. 13 shows the ⅜" insulated hook (405) with nylon wing nut (4051) according to a preferred embodiment. The ⅜" insulated hook (405) is provided with insulation (4052) to damp unwanted sound.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. The scope of embodiments is a least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

It will be understood by those skilled in the art that the foregoing general description and the following detailed description are explanatory of the invention and are not intended to be restrictive thereof.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof. Moreover, the technical effects and technical problems in the specification are exemplary and are not limiting. The embodiments described in the specification may have other technical effects and can solve other technical problems.

What is claimed is:

1. A multi-purpose percussion accessory stand assembly (1) for temporarily holding a plurality of implements and/or percussion instruments comprising:
   a primary board (10) having an upper horizontal support surface and an underside, said primary board (10) having a front edge surface, an opposing rear edge surface, and right and left side edge surfaces forming four corners;
   internally-threaded inserts (101) installed in each of the right and left side edge surfaces of said primary board (10) for mounting accessories (40);
   a guard board (20) which is attachable to the rear edge surface of said primary board (10), said guard board (20) having at least three evenly spaced semi-circular cut-outs (202) resulting in a scalloped upper edge;

at least four internally-threaded inserts (104) installed on the rear edge surface of said primary board (10) for securing said guard board (20) in a vertical position;

at least four internally-threaded inserts (105) installed on the underside of said primary board (10) adjacent the rear edge surface for securing said guard board (20) in a horizontal unused position;

at least four vertically-oriented internally-threaded inserts (106) respectively installed on each of the four corners on the upper horizontal support surface of said primary board (10);

a threaded flange (102) attached to the center of the underside of said primary board (1);

mounting hardware for attaching said primary board (10) to supports and stands;

accessories (40) configured to be removably attached to said primary board (10) for hanging or otherwise holding implements and/or percussion instruments; and at least three internally-threaded inserts (103) installed on the underside of said primary board (10) adjacent the front edge surface and spaced apart for receiving said accessories (40).

2. The multi-purpose percussion accessory stand assembly (1) as claimed in claim 1, wherein said primary board (10) is an upholstered lightweight board made of a material selected from the group consisting of plywood, pressboard and fiber board.

3. The multi-purpose percussion accessory stand assembly (1) as claimed in claim 1, wherein said primary board (10) further comprises:

at least two double-hinged connections (201) mounted on the underside of said primary board (10) adjacent the rear edge surface, wherein said guard board (20) is attachable to said double-hinged connections (201) so as to permit said guard board (20) to swing 270 degrees.

4. The multi-purpose percussion accessory stand assembly (1) as claimed in claim 1, wherein said mounting hardware comprises:

primary mount components (301); and at least four Z-shaped brackets (303).

5. The multi-purpose percussion accessory stand assembly (1) as claimed in claim 4, wherein said primary mount components (301) comprises:

a threaded mounting post (3011) for mounting said primary board (10) to stands with similar post size;

a multi-stop threaded mounting post insert (3012) which is insertable into an end of threaded mounting post (3011) for mounting said primary board (10) to stands with different post sizes;

an aluminum boom rail (3013); and at least two pipe clamps (3014).

6. The multi-purpose percussion accessory stand assembly (1) as claimed in claim 1, wherein said accessories (40) comprise:

a plurality of switch hooks (401), each of which is an aluminum dowel that has a threaded portion on one end and a slight upward bend at an end distal to the threaded portion;

a plurality of L-shaped side guard brackets (402) that are attachable to the underside of said primary board (10) such that a long leg of said L-shaped side guard brackets (402) extends perpendicular to the upper horizontal support surface of said primary board (10);

a plurality of semi-circular props (403) that are removably attachable to said inserts (106);

an insulated hook with nylon nut (405);

a carrying handle (406) that is removably attachable to said internally-threaded inserts (101) for easy portability;

a water-resistant slip-on travel bag;

a wrench for tightening bolts and nuts to assemble said percussion accessory stand assembly (1); and an accessory pouch (407) for storing said plurality of accessories (40).

7. The multi-purpose percussion accessory stand assembly (1) as claimed in claim 1, wherein said stand assembly (1) is portable and is configured to be compactly self-contained.

8. The multi-purpose percussion accessory stand assembly (1) as claimed in claim 1, wherein said guard board (20) is split vertically into more than one piece.

9. The multi-purpose percussion accessory stand assembly (1) as claimed in claim 1, wherein said guard board (20) is split vertically in a 60:40 split.

\* \* \* \* \*